L. C. MALTBY.
MACHINE FOR MAKING ARTIFICIAL STRAWS.
APPLICATION FILED FEB. 12, 1916.
1,205,914.
Patented Nov. 21, 1916.
3 SHEETS—SHEET 1.
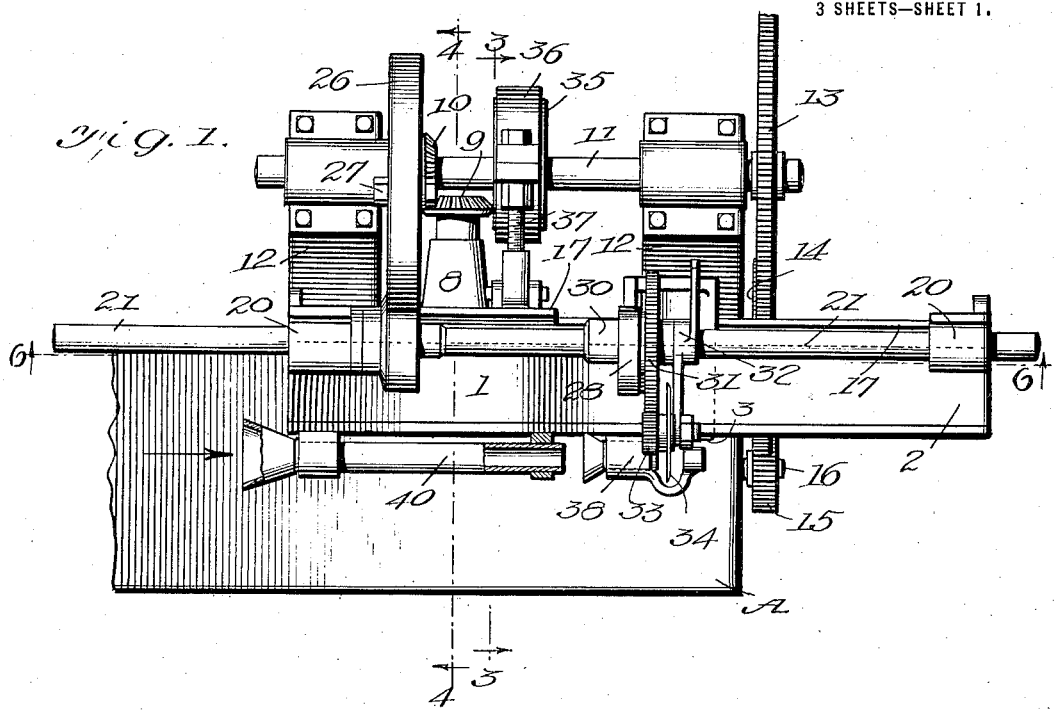
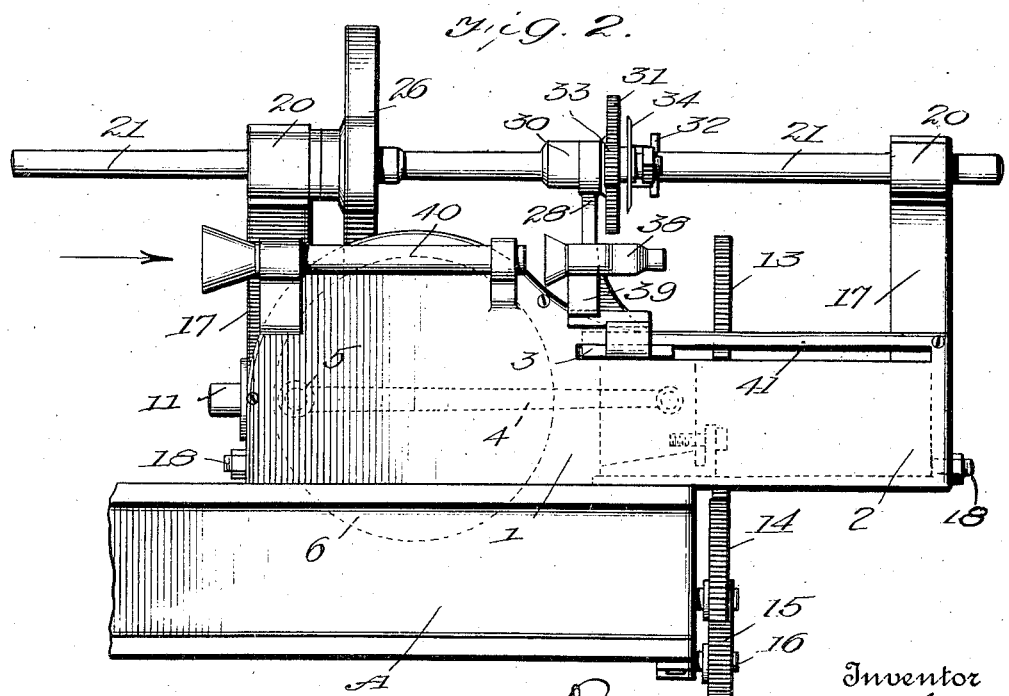
Inventor
Lewis C. Maltby
By Vernon E. Hodges
his Attorney

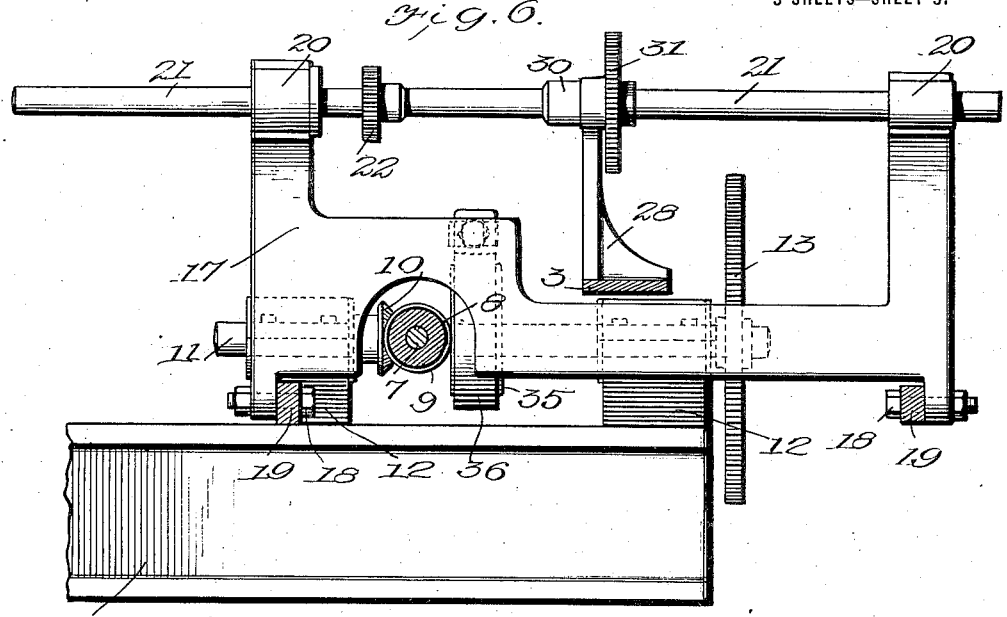

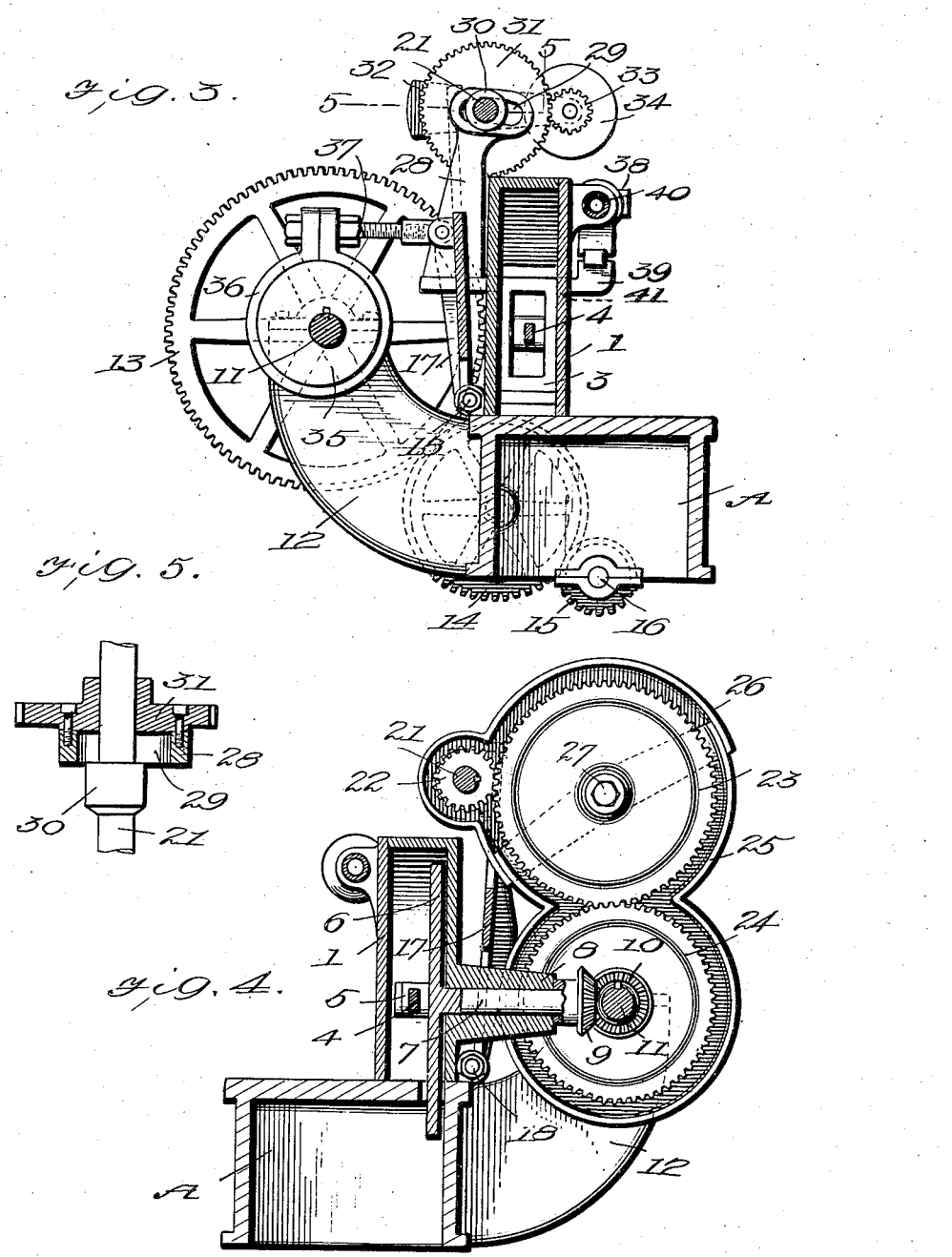

UNITED STATES PATENT OFFICE.

LEWIS C. MALTBY, OF WASHINGTON, DISTRICT OF COLUMBIA, ASSIGNOR TO THE STONE STRAW COMPANY, OF WASHINGTON, DISTRICT OF COLUMBIA, A CORPORATION OF NEW JERSEY.

MACHINE FOR MAKING ARTIFICIAL STRAWS.

1,205,914.  Specification of Letters Patent.  Patented Nov. 21, 1916.

Application filed February 12, 1916. Serial No. 78,060.

*To all whom it may concern:*

Be it known that I, LEWIS C. MALTBY, a citizen of the United States, residing at Washington, in the District of Columbia, have invented certain new and useful Improvements in Machines for Making Artificial Straws, of which the following is a specification.

My invention relates to an improvement in machines for making artificial straws, and this particular invention has in view the principle of a planetary gear carrying a disk cutter, which travels around and is rotated by a large gear carried on a rocking-frame, which, at the proper interval, swings into a position where the disk cutter crosses the path of the straw and cuts the latter into lengths, the rocking frame and various parts which coöperate in the cutting operation traveling momentarily with and at the speed of the straw, which is necessary in order to permit the disk cutter to get out of the way of the straw, or in other words in order not to retard it or cause buckling of the straw, which would otherwise result.

In the accompanying drawings:—Figure 1 is a plan view; Fig. 2 is a view in side elevation; Fig. 3 is a transverse sectional view on the line 3—3 of Fig. 1, looking to the right or in the direction of the arrow; Fig. 4 is a sectional view on the line 4—4 of Fig. 1, looking to the left or in the direction of the arrow; Fig. 5 is a section on the line 5—5 of Fig. 3; Fig. 6 is a view in side elevation with parts removed in order to show the rocking-frame; Figs. 7, 8 and 9 are diagrammatic views showing three different positions of the rocking-frame and disk cutter.

A, is the machine-bed or frame mounted on suitable legs or other supports (not shown). A housing 1 is located on the bed, which terminates at the forward end in a cross-head or plunger-guide 2, in which the cross-head or plunger 3 is reciprocated by means of the connecting-rod 4 extending from the wrist-pin 5 on the crank-disk 6, which latter is secured on the cross-shaft 7 journaled in the bearing 8. This cross-shaft has a bevel gear 9 on its outer end, which meshes with a bevel-gear 10 keyed on countershaft 11 through which these several parts are driven. The countershaft 11 is rotatably supported in the arms 12, and on one end the large gear 13 is keyed, the teeth of which mesh with an intermediate idle-gear 14, which latter is driven by the smaller gear 15 secured on the main drive-shaft 16.

A rocking-frame 17 is pivoted by the bolts 18 to lugs 19 on the bed A, and in the collars 20 at the upper end of this frame the shaft 21 is mounted to both rotate and reciprocate. This shaft 21 has a small gear 22 splined thereon, and the teeth of this small gear engage the teeth of an idler 23, which latter is driven by gear 24 keyed on the countershaft. These three gears are housed in the casings 25 and 26, and the bolt 27 upon which the idler 23 turns, is supported in both casings 25 and 26 (as shown in Fig. 4), which admits of the swinging of the shaft 21 with the rocking-frame 17 which supports it, the casings turning and giving to the lateral movement of the shaft 21 with the oscillation of the frame 17 without interfering in any way with the perfect action of the gears.

An arm 28 extends upwardly from the cross-head 3 along one side of the housing 1, and has a curved elongated slot 29 therein, through which the shaft 21 passes and is capable of swinging laterally, the size and shape of the slot 29 affording clearance therefor. A collar 30 is secured to the shaft 21 on one side of the arm 28, and the large gear-wheel 31 is secured to one side of the arm 28, and a counterbalanced arm 32 is secured to the shaft 21 adjacent to the gear-wheel 31, so that while the wheel 31 does move endwise with the shaft, it does not rotate; but the arm 32 secured to the shaft does rotate with it and carries the small gear 33 to which is attached the disk cutter 34. Therefore, as the shaft revolves, the disk cutter is turned through engagement of the gear 33 with the larger gear 31 in an orbital movement around the latter.

The rocking-frame is oscillated through the medium of an eccentric 35 secured on the countershaft 11, and the eccentric strap 36 fitted thereon, and the connecting-rod 37 extending from the strap to the rocking-frame, as shown in Figs. 7, 8 and 9. Figs. 7, 8 and 9 show three different positions of the eccentric and the rocking-frame 17, and the gear 33 which carries the disk cutter makes three complete revolutions around the large gear 31 to every complete rotation of the eccentric 35, so that on every third transit of the disk cutter, the straw S is cut, (as is illustrated in Fig. 9), and the disk cutter makes three more circuits to the length of the straw S to be cut before it returns to make another cut.

The straw-guide section 38 is secured to an arm 39 projecting from the cross-head or plunger on the side opposite the arm 28, it extending through a slot 41 in the housing extension 2 provided therefor. A stationary straw-guide 40 is stationed in line with the section 38 on one side of the housing 1.

I claim:

1. The combination with means for guiding and supporting the article to be cut, of a disk cutter, and means for imparting thereto a rotary oscillatory, orbital, reciprocating motion.

2. The combination with means for guiding and supporting the article to be cut, of a disk cutter which has a rotary, oscillatory, orbital, reciprocating motion imparted thereto.

3. The combination with a straw guide and a cross-head or plunger for reciprocating the latter, of a disk cutter which has a rotary oscillatory orbital reciprocating motion, and means for causing said disk cutter to reciprocate with the straw guide.

4. The combination with a machine-bed or frame, a rocking-frame, a shaft carried by the latter, and a rotary disk cutter which travels and rotates concentrically around the shaft, of means for rocking the rocking-frame to bring the disk cutter across the path of the straw to be cut at intervals during certain circuits around the shaft.

5. The combination with a machine-bed or frame, a rocking frame pivoted thereto, a sliding rotary shaft carried thereby, a slidable non-rotary gear-wheel and a disk cutter carried by the shaft and revolving with and rotated by the non-rotating gear-wheel, a straw-guide through which the straws to be cut are fed, of means for swinging the rocking frame laterally while the disk cutter is being moved forwardly to cause the disk cutter to cross the path of the straw at the speed of the straw.

6. The combination of a rocking frame, a shaft slidably carried by the upper end of said rocking-frame, a reciprocating cross-head or plunger, an arm extending from the latter through which said shaft passes loosely, a gear secured to said arm, an arm secured to the shaft, and carrying a combined gear and disk cutter, the teeth of which gear mesh with the teeth secured to the arm, whereby as the arm revolves the disk cutter is rotated, a straw guide carried by the cross-head or plunger, and means for oscillating the rocking frame.

7. The combination with a machine-bed or frame, a rocking frame pivoted thereto, means for rocking the latter, a shaft rotatably supported in said frame, a rotary disk cutter which has orbital motion with respect to the shaft, a straw guide, of means for moving the straw guide and disk cutter at the speed of the straw, a counter-shaft, gears on the two shafts, an intermediate idle-gear, and telescopic casings inclosing said gear-wheels.

In testimony whereof I affix my signature.

LEWIS C. MALTBY.